Figure 1:
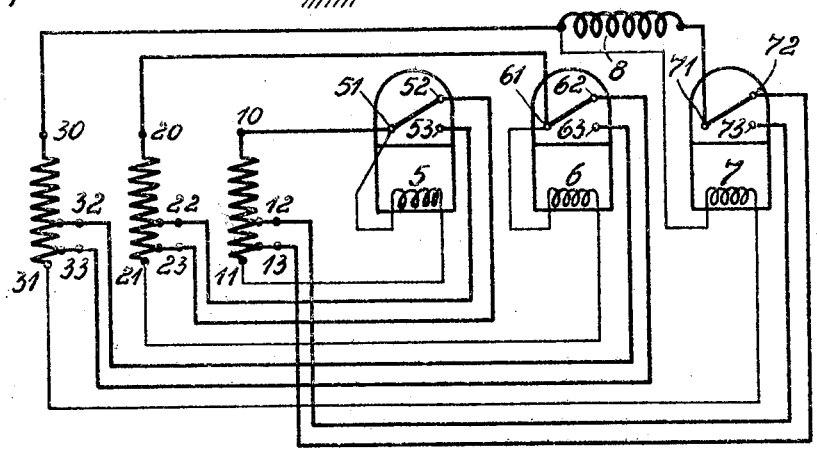

Dec. 9, 1930.   R. SCHIMPF   1,784,682

ARC GROUND SUPPRESSORS

Filed April 12, 1929   2 Sheets-Sheet 1

Inventor
Robert Schimpf
by Knight Bro.
Attorney

Dec. 9, 1930.    R. SCHIMPF    1,784,682
ARC GROUND SUPPRESSORS
Filed April 12, 1929    2 Sheets-Sheet 2

Patented Dec. 9, 1930

1,784,682

UNITED STATES PATENT OFFICE

ROBERT SCHIMPF, OF BERLIN-SCHLACHTENSEE, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ARC-GROUND SUPPRESSOR

Application filed April 12, 1929, Serial No. 354,595, and in Germany April 19, 1928.

My invention relates to improvements in arc-ground suppressors, and more particularly to such suppressors for at least partially compensating the watt ground current in an electric system.

It is already known in the art to compensate the capacitive ground current by an inductive suppressing device of known design. In order to compensate completely or partially also the watt ground current, which is developed owing to the ohmic resistance of the suppressing device, the discharge line and so on, according to my invention in case of a ground a voltage is impressed upon the suppressing device, which voltage is displaced in phase as regards time to the voltage between the neutral point of the system and ground. When using a quenching transformer or neutral compensator the arrangement is preferably such, that in case of a ground the individual windings of the quenching transformer are made unsymmetrical by connecting the lines to corresponding taps provided on the primary or secondary side of the quenching transformer. In this way a phase displacement is easily obtained in the voltage impressed upon the choke or reactance coil. In order to avoid a variation in the value of the voltage impressed upon the reactance coil in case of different numbers of turns of the individual phase windings, the number of turns of one phase winding may, for instance, be increased while the number of turns of the corresponding other phase winding is reduced. The change-over of the phase connections most suitable for the ground developed at the time depends upon which of the individual phases has developed the ground. According to my invention a ground relay is therefore connected between each phase and the ground, if necessary through a transformer, which effects the necessary commutation of the connections of the windings of the quenching transformer when that phase has connection to ground. The ground relay may preferably also be connected to a secondary winding of the quenching transformer or neutral compensator.

In the drawing affixed hereto and forming part of my specification two embodiments of my invention are illustrated by way of example. In the drawing Fig. 1 is a diagrammatic illustration of one embodiment of my invention, and Fig. 2, a modified embodiment.

Referring to Fig. 1 of the drawings, 1, 2, 3 are the lines of a three-phase system, which is to be protected against an accidental connection to ground by the quenching transformer or neutral compensator 4. The terminals of the secondary windings of the quenching transformer are indicated by the respective numerals of reference 10, 11 or 20, 21 or 30, 31. Each secondary winding is furthermore provided with a plurality of taps 12, 13 or 22, 23 or 32, 33. The terminal 10 of one phase is connected to the contact 51 of the ground relay 5, the terminal 20 of the second phase to the contact 61 of the ground relay 6 and the terminal 30 of the third phase through the suitably selected reactance coil 8 to the contact 71 of the ground relay 7.

The contact 52 of the ground relay 5 is connected with the lower tap 23 of the second phase, the contact 62 of the ground relay 6 to the lower tap 33 of the third phase and the contact 72 of the ground relay 7 to the lower tap 13 of the first phase. The contact 53 of the ground relay 5 is connected to the tap 22, the contact 63 of the ground relay 6 to the tap 32 and the contact 73 of the ground relay 7 to the tap 12. The ground relay 5 is fed by the secondary phase voltage of the quenching transformer belonging to line 1 of the system, the ground relay 6 from the secondary phase voltage belonging to line 2 of the system and the ground relay 7 by the secondary phase voltage belonging to line 3 of the system.

The apparatus operates in the following manner: in normal operation the ground relays 5, 6 and 7 are energized and the contacts 51, 52 or 61, 62 or 71, 72 bridged. If now an accidental connection to ground occurs at the point K of line 3 of the system, for instance, the respective phase voltage on the primary as well as on the secondary side becomes practically zero. The ground relay 7 is thus deenergized, whereby the bridge of the contacts 71 and 72 is removed and the contact 71 is connected with the contact 73 instead. The reactance coil 8 is now only fed from the two secondary phase windings of the sound lines 1 and 2 of the system connected in series. One of these secondary windings now has fewer effective turns than the other, since the throwing of relay 7 puts in circuit with coil 8 only the turns between the points 10 and 12 of the secondary coil belonging to phase 1, whereas all the turns of the secondary coil of phase 2 are in circuit with coil 8. All of the turns of the secondary coil of phase 3 are also in circuit, but this coil is not excited. By means of this arrangement is attained the desired displacement of the induced voltage in the arc-ground suppressor. By a judicious choice of the taps the desired phase displacement may be attained without changes in the value of the voltage at the reactance coil.

Figure 2:
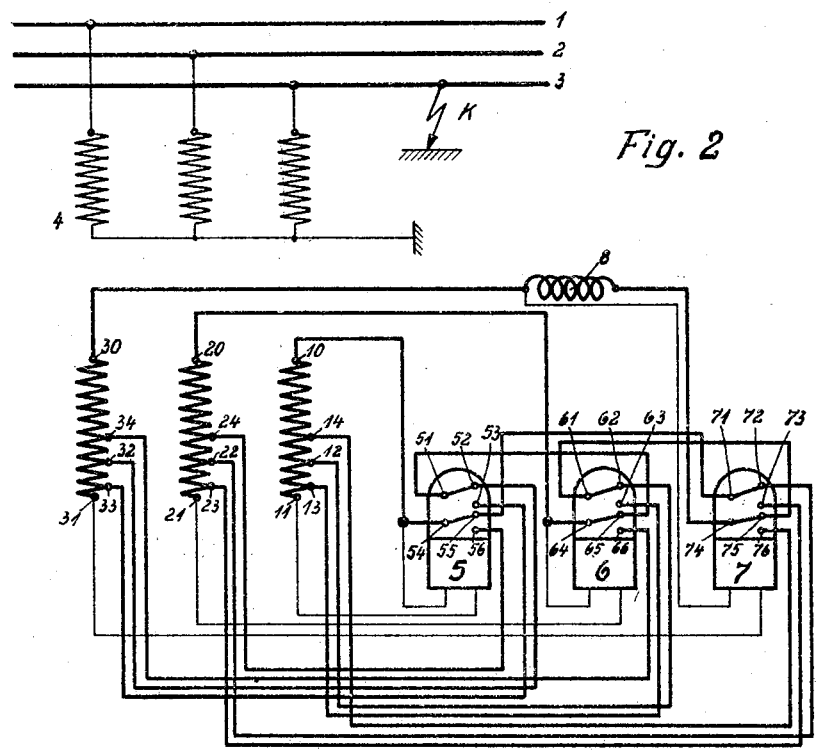

Fig. 2 of the drawing illustrates a modified embodiment of my invention, in which in the event of a ground the number of the operative windings of one sound phase winding of the quenching transformer is increased and the number of the operative windings of the other sound phase winding of the quenching transformer is so reduced, that the voltage impressed upon the reactance coil retains its value, but receives a different phase position. Besides the details shown in Fig. 1, each of the secondary windings 4 of the quenching transformer possesses a further tap 14, or 24, or 34. The ground relays 5 to 7 each has a change-over switch 51, or 61, or 71, and a further change-over switch 54, or 64, or 74.

The mode of operation of the system is as follows:

In normal operation the ground relays 5, 6 and 7 are energized and the contacts 51, 52 and 54, 55 or 61, 62 and 64, 65 or 71, 72 and 74, 75 bridged. If a short to ground occurs now at point K, for instance, in the line 3 of the system, the ground relay 7 becomes deenergized as in the previous example, and the contact 71 is connected to the contact 73, and contact 74 to the contact 76. The reactance coil 8 is now only fed by the two phase windings connected in series relation with the sound lines 1 and 2 of the system, the number of the operative windings of one of the sound phase windings being correspondingly reduced by connecting the contact 74 with 76 and the change-over of the corresponding line to the tap 14 caused thereby. The other is correspondingly increased by connecting the contacts 71 and 73 and the change-over caused thereby of the corresponding line to the tap 23. The circuit for the reactance coil 8 is then as follows: from 30 through the reactance coil 8, the contacts 74 and 76, the tap 14 through the winding up to 10, the contacts 54 and 55, the contacts 71 and 73, the tap 23, the respective winding up to 20, contacts 64 and 65, contacts 51 and 52, the tap 32 and through the respective winding back to terminal 30.

In this way the voltage impressed upon the reactance coil 8 retains its value, but takes up another phase position. When an accidental connection to ground occurs in one of the two other lines 1 or 2 of the system either the ground relay 5 or 6 responds, in the same manner as described before.

Various modifications and changes may be made without departing from the spirit and the scope of the invention, and I desire, therefore, that only such limitations shall be placed thereon as are imposed by the prior art.

I claim as my invention:

1. An arc-ground suppressor for electrical net works comprising in combination, means for compensating the capacitative ground current, automatic switching devices dependent upon the voltages between the lines of the net work and ground, and phase shifting connections between the switching devices and the means for compensating the capacitative ground current, the actuation of a switching device operating to so shift the voltage phase of the means for compensating the capacitative ground current that the ohmic ground current is also compensated at least in part.

2. An arc-ground suppressor for electrical net works comprising in combination, means for compensating the capacitative ground current, said means comprising a transformer with loaded secondary coils, automatic switching devices dependent upon the voltages between the lines of the net work and ground, and phase shifting connections between the switching devices and the means for compensating the capacitative ground current, the actuation of a switching device operating to so shift the current phase in the corresponding secondary winding that the ohmic ground current will also be compensated at least in part.

3. An arc-ground suppressor for electrical net works comprising in combination, means for compensating the capacitative ground current, said means comprising a plurality of induction coils with taps, automatic switching devices dependent upon the voltages between the lines of the net work and ground, and phase shifting connections between the contacts of the switching devices and the taps of the coils, the actuation of a switching device operating to cut in and to cut out turns of the induction coils to so shift the phase voltage that the ohmic ground current will also be compensated at least in part.

4. An arc-ground suppressor for electrical net works comprising in combination, means for compensating the capacitative ground current, said means comprising a plurality of induction coils with taps, automatic switching devices dependent upon the voltages between the lines of the net work and ground, and phase shifting connections between the contacts of the switching devices and the taps of the coils, the actuation of a switching device operating to increase the number of effective turns of one coil and to decrease the number of turns of another coil to so shift the voltage phase without changing the voltage value that the ohmic ground current is also compensated at least in part.

In testimony whereof I affix my signature.

ROBERT SCHIMPF.